United States Patent
Ejima et al.

(10) Patent No.: US 6,952,230 B2
(45) Date of Patent: Oct. 4, 2005

(54) INFORMATION PROCESSING APPARATUS, CAMERA AND METHOD FOR DELETING DATA RELATED TO DESIGNATED INFORMATION

(75) Inventors: Satoshi Ejima, Tokyo (JP); Akihiko Hamamura, Chiba (JP)

(73) Assignee: Nikon Corporation, Tokyo (JP)

( * ) Notice: Subject to any disclaimer, the term of this patent is extended or adjusted under 35 U.S.C. 154(b) by 702 days.

(21) Appl. No.: 09/928,511

(22) Filed: Aug. 14, 2001

(65) Prior Publication Data

US 2002/0027602 A1 Mar. 7, 2002

Related U.S. Application Data

(63) Continuation of application No. 08/965,522, filed on Nov. 6, 1997, now abandoned..
(60) Provisional application No. 60/052,909, filed on Jul. 11, 1997.

(30) Foreign Application Priority Data

Feb. 17, 1997 (JP) .............................................. 9-031827

(51) Int. Cl.⁷ .............................................. H04N 5/222
(52) U.S. Cl. .............................. 348/333.05; 348/231.2; 348/333.01; 348/333.11; 348/333.12; 348/333.02
(58) Field of Search ....................... 348/333.01, 333.02, 348/333.04, 333.05, 333.12, 333.11, 231.2, 231.6, 231.3, 14.03

(56) References Cited

U.S. PATENT DOCUMENTS

| | | | | |
|---|---|---|---|---|
| 5,008,854 A | * | 4/1991 | Maeda et al. ................ | 345/641 |
| 5,521,637 A | * | 5/1996 | Asaida et al. ............ | 348/222.1 |
| 5,633,678 A | | 5/1997 | Parulski et al. ............. | 348/552 |
| 5,648,760 A | | 7/1997 | Kumar ........................ | 345/435 |
| 5,648,816 A | | 7/1997 | Wakui ......................... | 348/223 |
| 5,689,742 A | * | 11/1997 | Chamberlain, IV ......... | 396/313 |
| 5,706,457 A | | 1/1998 | Dwyer et al. ............... | 345/349 |
| 5,717,967 A | * | 2/1998 | Lee et al. .................... | 396/313 |
| 5,796,428 A | * | 8/1998 | Matsumoto et al. ... | 348/207.99 |
| 5,845,161 A | * | 12/1998 | Schrock et al. ............. | 396/313 |
| 5,903,309 A | * | 5/1999 | Anderson .............. | 348/333.02 |
| 5,963,204 A | * | 10/1999 | Ikeda et al. ................. | 345/723 |
| 6,020,982 A | | 2/2000 | Yamauchi et al. .......... | 358/444 |
| 6,097,431 A | * | 8/2000 | Anderson et al. ......... | 348/231.7 |
| 6,128,037 A | * | 10/2000 | Anderson ................. | 348/231.4 |
| 6,215,523 B1 | * | 4/2001 | Anderson ............. | 348/333.05 |
| 6,226,449 B1 | * | 5/2001 | Inoue et al. ................. | 386/120 |
| 6,249,316 B1 | * | 6/2001 | Anderson ............. | 348/333.05 |
| 6,296,387 B1 | * | 10/2001 | Guillemaud ................ | 378/207 |
| 6,334,025 B1 | | 12/2001 | Yamagami | |
| 2002/0057294 A1 | * | 5/2002 | Ejima et al. ................ | 345/792 |

FOREIGN PATENT DOCUMENTS

JP       08-081167       3/1996       ........... B66B/13/18

OTHER PUBLICATIONS

U.S. Appl. No. 60/033,586, "Information processing apparatus", Satoshi Ejima et al., filed Dec. 20, 1996.*

* cited by examiner

*Primary Examiner*—Wendy R. Garber
*Assistant Examiner*—Nelson D. Hernandez
(74) *Attorney, Agent, or Firm*—Oliff & Berridge, PLC

(57) ABSTRACT

An information processing apparatus is provided in which multiple types of information is stored and only predetermined information is deleted independent the other types of information that has been input to the apparatus. As such, after displaying on a screen a table of the various types of information being stored in the apparatus, if a thumbnail image is chosen and the delete key is selected, then only the image corresponding to the chosen thumbnail image is deleted from the memory, as well as from the table. In addition, sound and memo information relating to the chosen thumbnail image are maintained without change. If the execution key is selected after choosing a specific type of information, the chosen information is reproduced once, and after user confirms the content, the reproduced information is deleted by selecting the delete key. In addition, when a plurality of information is chosen, selection of the delete key deletes all the chosen information.

19 Claims, 12 Drawing Sheets

2x2 PIXEL AREA

| a | b | a | b | a | b | a | b |
|---|---|---|---|---|---|---|---|
| c | d | c | d | c | d | c | d |
| a | b | a | b | a | b | a | b |
| c | d | c | d | c | d | c | d |
| a | b | a | b | a | b | a | b |
| c | d | c | d | c | d | c | d |

CCD 20

FIG. 7

3x3 PIXEL AREA

| a | b | c | a | b | c | a | b | c |
|---|---|---|---|---|---|---|---|---|
| d | e | f | d | e | f | d | e | f |
| g | h | i | g | h | i | g | h | i |
| a | b | c | a | b | c | a | b | c |
| d | e | f | d | e | f | d | e | f |
| g | h | i | g | h | i | g | h | i |

CCD 20

FIG. 8

INFORMATION PROCESSING APPARATUS, CAMERA AND METHOD FOR DELETING DATA RELATED TO DESIGNATED INFORMATION

RELATED PROVISIONAL APPLICATION

This is a Continuation of application Ser. No. 08/965,522 filed Nov. 6, 1997, now abandoned. The entire disclosure of the prior application is hereby incorporated by reference herein in its entirety.

This nonprovisional application claims the benefit of Provisional Application No. 60/052,909, filed Jul. 11, 1997.

INCORPORATION BY REFERENCE

The disclosure of the following priority application is herein incorporated by reference: Japanese Patent Application No. 9-031827, filed Feb. 17, 1997.

BACKGROUND OF THE INVENTION

1. Field of Invention

The present invention relates to an information processing apparatus, and relates in particular to an information processing apparatus in which multiple types of information are input, for example, and only predetermined information is deleted independent of all other types of information that has been input.

2. Description of Related Art

In recent years, electronic cameras have begun to replace cameras which use film. When using an electronic camera, the image of an object is recorded using, for example, a CCD (charged coupled device), where the image is converted to digital data, and the converted data is then recorded into internal memory, or even a removable memory card. An image which is recorded using such an electronic camera may immediately be reproduced and displayed on a screen, such as, for example, an LCD or CRT, without going through the development and printing steps that are required for a conventional camera.

Moreover, some electronic cameras are now capable of inputting sound as well as images. Furthermore, it is possible to input a handwritten memo into an electronic camera. In such a case, sound and written information may be correlated to an image (i.e., a photographed image) and stored. By so doing, it becomes possible to record sound surrounding the object while recording the object, or even to record a simple handwritten memo indicating the place where the recording was done and some features of the object.

In deleting multiple types of information input into an electronic camera capable of inputting and recording multiple types of information, it is possible to delete related information during the deletion of a particular information, for example. However, the deletion of the related information may be unintentional or erroneous and result in the deletion of information which is not meant to be deleted. Obviously, this presents a problem to the user.

SUMMARY OF THE INVENTION

In order to overcome the shortcomings in the prior art mentioned above, according to one aspect of the invention, it is possible to input multiple types of information while still being able to specifically delete predetermined information independent of all other input information.

In particular, according to a first embodiment of the invention, an information processing apparatus incorporating this aspect of the invention includes an information input means, such as, for example, a CCD, microphone, or touch tablet, for inputting multiple types of information simultaneously or non-simultaneously. In addition, the apparatus includes memory means, designation means, and deletion means. The memory means may be, for example, a memory card for storing the multiple types of information input by the information input means. The designation means may be, for example, a touch tablet and pen, for arbitrarily designating one or more pieces of information from the multiple types of information stored in the memory means. The deletion means may be, for example, a CPU, for deleting the one or more pieces of information which are designated by the designation means. The information processing apparatus may also include reproduction means for reproducing one or more pieces of information which have been designated by the designation means.

The information processing apparatus can also include instruction means, such as, for example, a touch tablet and pen, for indicating whether or not the information which is reproduced by the reproducing means is to be deleted from the memory means. A deletion means may also be included for deleting the predetermined information from the memory means when instructions to delete the information is provided by the instruction means.

Moreover, a display control means, for displaying symbols corresponding to the multiple types of information in a predetermined screen, may also be included where the multiple types of information may be images, sound and line drawings. Also, the displayed symbols may be icons.

In addition, the memory means may include an area for storing the image, an area for storing the sound and an area for storing the line drawings.

A display means, such as, for example, an LCD, for displaying the images and, the line drawings that are stored in the memory means, may also be provided.

Additionally, the information processing apparatus may also provide sound output means, such as, for example, a speaker, for outputting the sound stored in the memory means.

BRIEF DESCRIPTION OF THE DRAWINGS

The invention will be described in conjunction with the following drawings in which like reference numerals designate like elements and wherein:

FIG. 7 illustrates an example of the process of thinning pixels;

FIG. 8 illustrates another example of the process of thinning pixels;

DETAILED DESCRIPTION OF PREFERRED EMBODIMENTS

Figure 1:
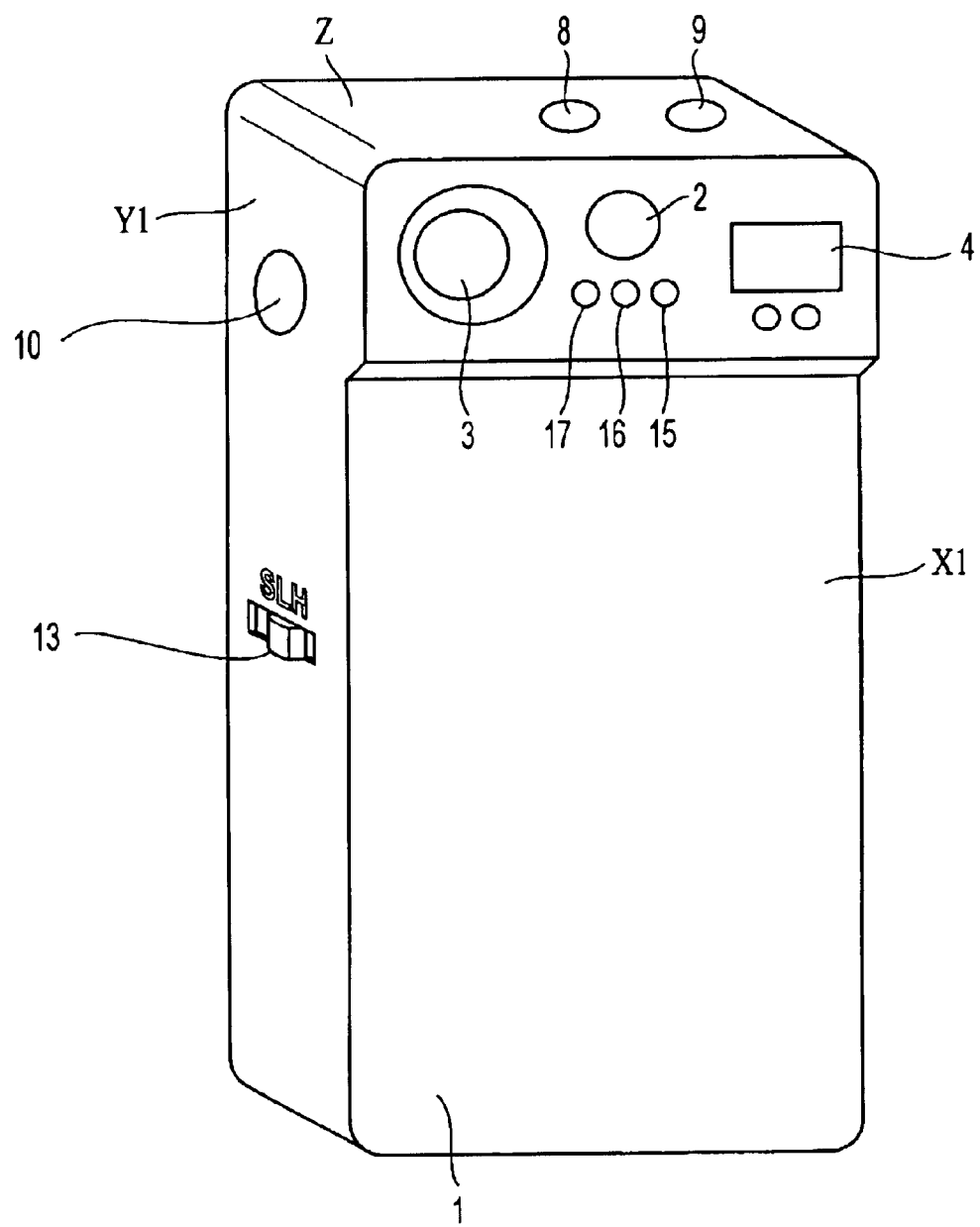
FIG. 1 is a perspective frontal view of an electronic camera, which is one type of information processing apparatus according to an embodiment of the present invention.

While the invention will hereafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

Hereafter, a detailed description of embodiments of the information processing apparatus of this invention is provided with reference to the drawings. In the drawings, like reference numerals have been used throughout to designate like elements.

Figure 2:
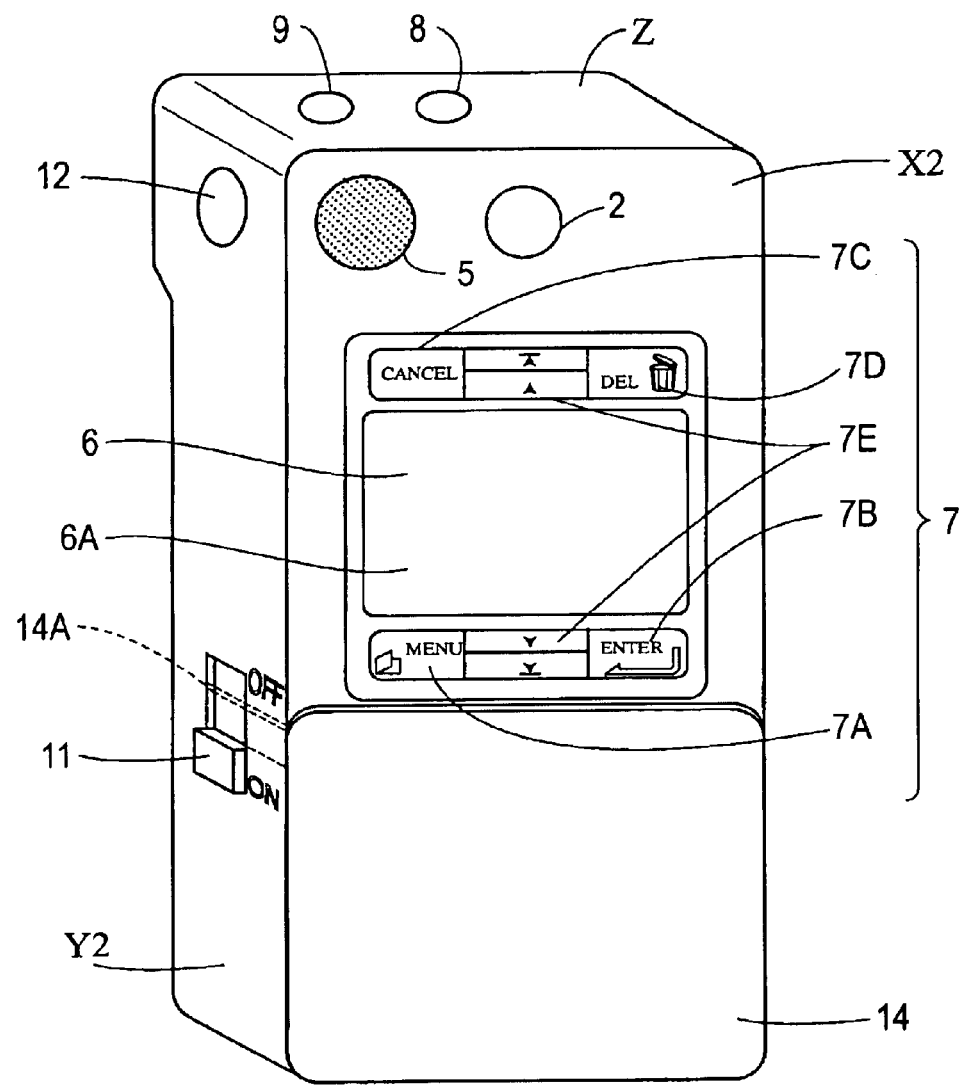
FIG. 2 is a perspective rear view of the electronic camera of FIG. 1, with the LCD cover being in the open position.

FIG. 1 and FIG. 2 are front and rear perspective views, respectively, illustrating the structural configuration of an electronic camera. The electronic camera is a type of information processing apparatus according to an embodiment of the present invention. The surface facing the object of the electronic camera is defined as the surface X1, as shown in FIG. 1, and the surface facing the user is defined as the surface X2, as shown in FIG. 2, when an object is being recorded. The top, edge section of the surface X1, includes a viewfinder 2 that is used to verify the recording range of the object, a lens 3 which takes in the optical (light) image of the object, and a light emitting unit, or strobe light, 4 which emits light to illuminate the object that is being recorded.

Figure 4:
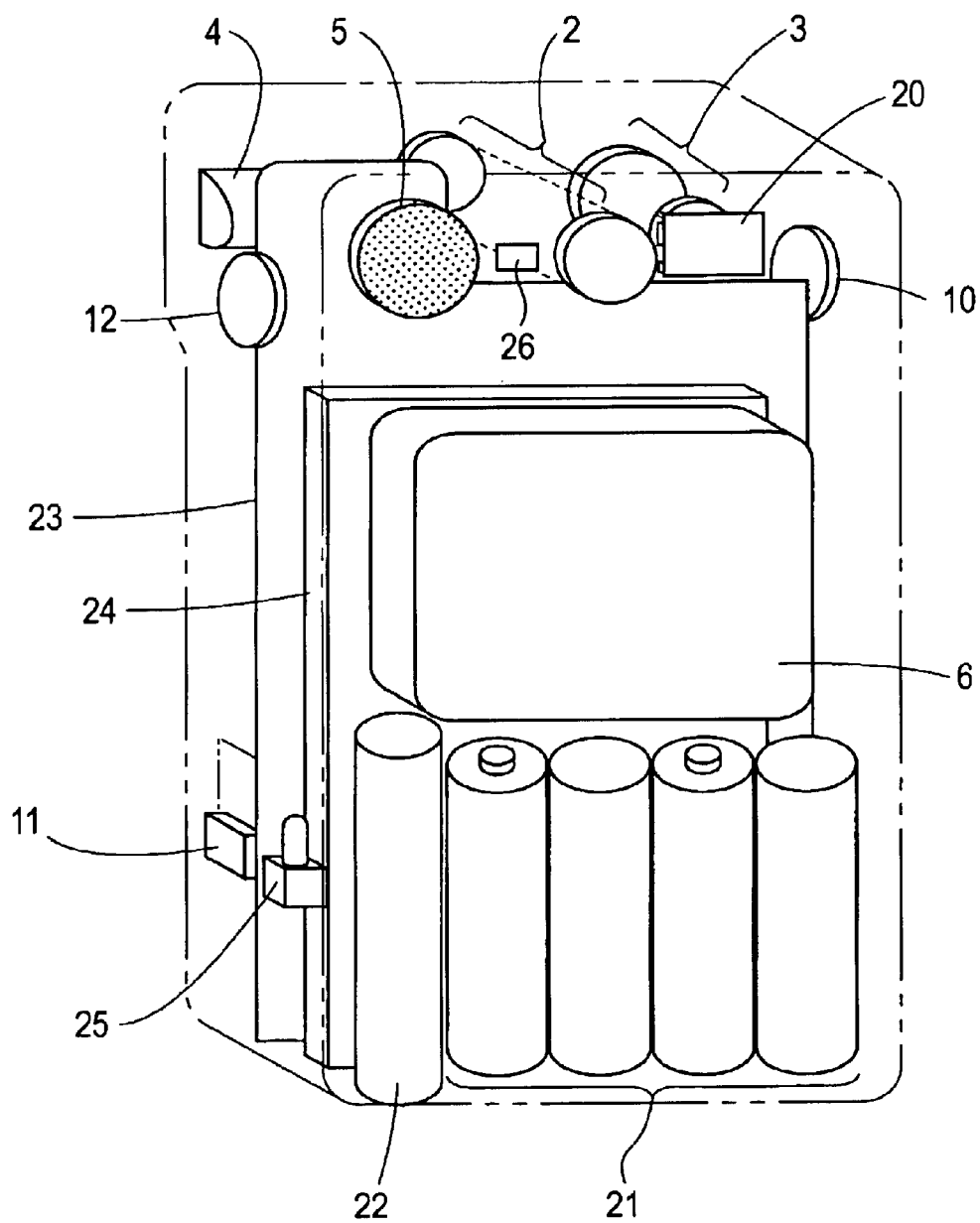
FIG. 4 is a perspective rear view of the internal construction of the electronic camera of FIG. 1.

Also included on the surface X1 is a photometry device 16 which measures light during the operation of the red-eye reducing (RER) LED 15, which reduces red-eye in recordings by emitting light before the strobe 4 emits light. The photometry device 16 and CCD 20, as shown in FIG. 4, are stopped while strobe 4 is emitting light. A colorimetry device 17 measures color when the operation of the CCD 20 has stopped.

Looking at FIG. 2, the top, edge section of the surface X2, includes the viewfinder 2 and a speaker 5 which outputs sound being recorded by the electronic camera 1. In addition, the LCD 6 and the control key area 7 are provided beneath the viewfinder 2 and speaker 5. On the surface of the LCD 6, there is a touch tablet 6A designed to output position data corresponding to the position designated by the touching operation of a pointing device, such as a pen, which will be explained in further detail below.

The touch tablet 6A is made of transparent material, such as glass or resin, for example, allowing the user to view an image formed beneath the touch tablet 6A and displayed on the LCD 6.

Figure 6:
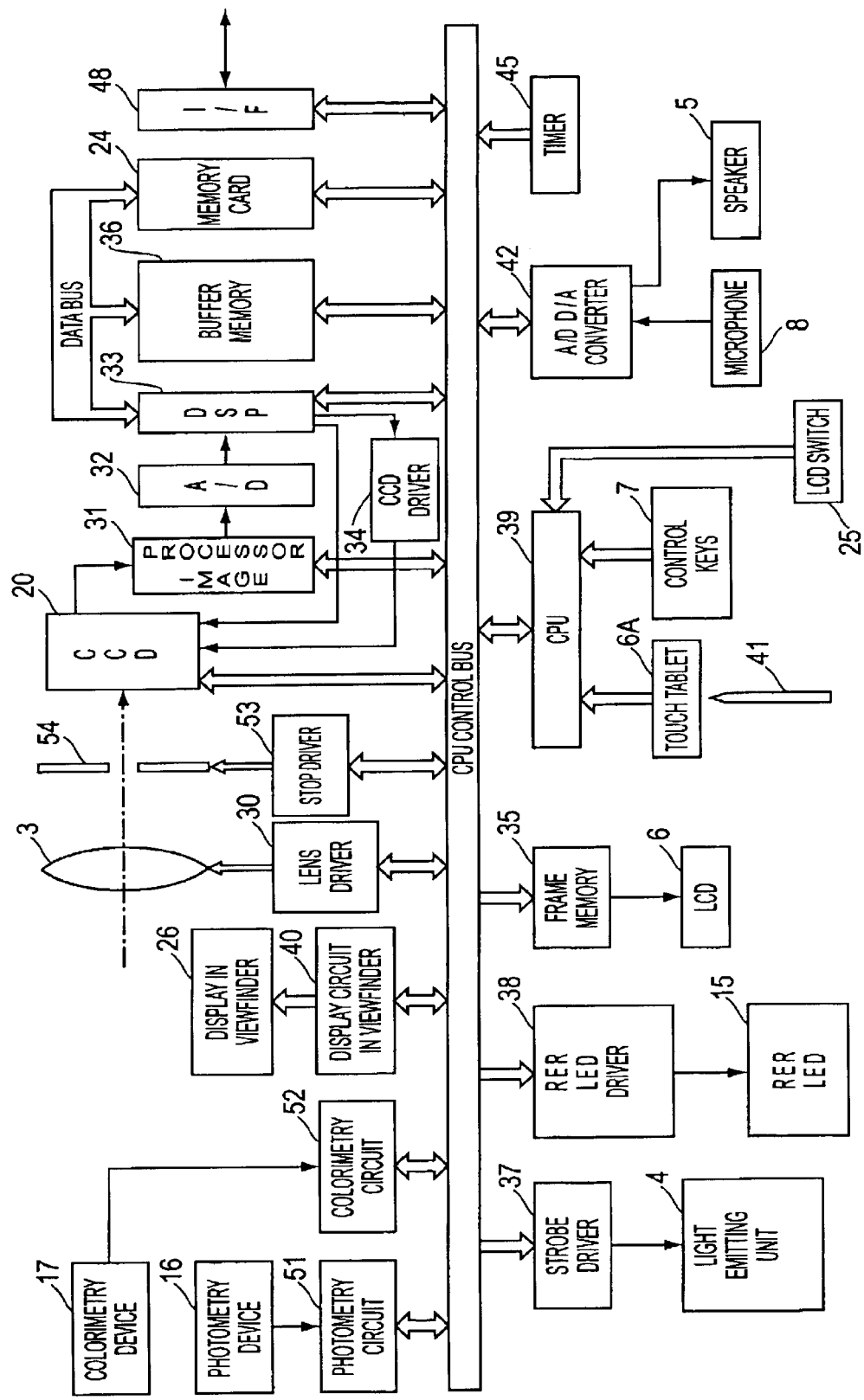
FIG. 6 is a block diagram of the components of the electronic camera of FIG. 1.

The control key area 7 is operated when reproducing and displaying recording data on the LCD 6. The control key area 7 also detects operation, or input, by the user and directs the input information to the CPU 39, as depicted in FIG. 6. The control key area 7 includes a menu key 7A, execution key 7B, control key 7C, delete key 7D and scroll key 7E.

Menu key 7A is operated to display the menu screen on the LCD 6. Execution key 7B is operated when reproducing the recorded information selected by the user. Cancel key 7C interrupts the reproduction process of the recorded information. Delete key 7D is used when deleting recorded information. Scroll key 7E scrolls the screen vertically when the recording information is displayed on the LCD 6 as a table.

Figure 3:
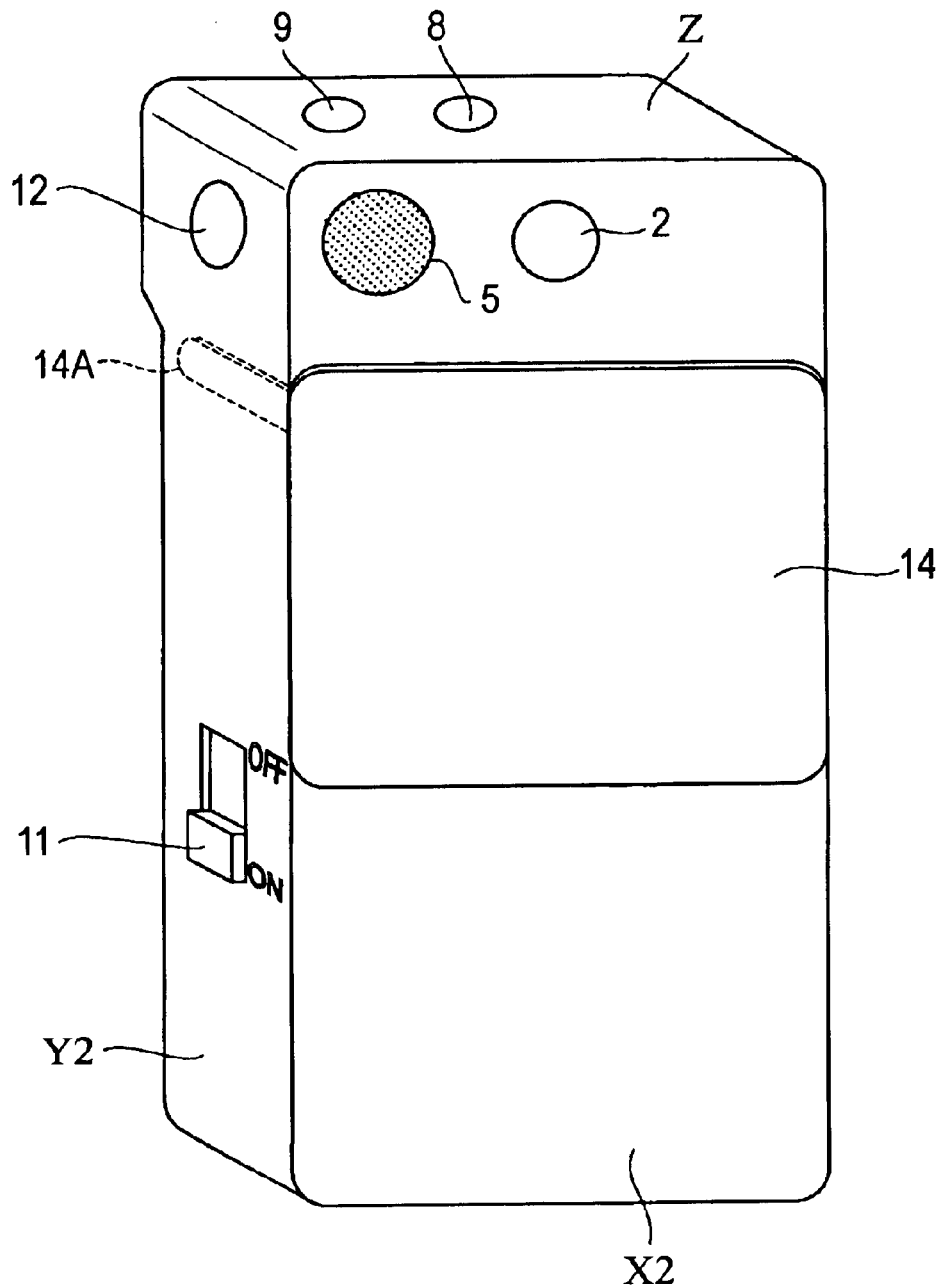
FIG. 3 is a perspective rear view of the FIG. 1 electronic camera of FIG. 1, with the LCD cover being in the closed position.

An LCD cover 14, which slides freely, is provided to protect the LCD 6 when it is not in use. When moved upward, toward the surface X2, the LCD cover 14 shields the LCD 6 and touch tablet 6A as shown in FIG. 3. When the LCD cover is moved downward, away from the surface X2, as shown in FIG. 2, the LCD 6 and touch tablet 6A are exposed, while simultaneously, the power switch 11, which is arranged on the surface Y2, is switched to the on-position by the arm member 14A of the LCD cover 14.

Returning to FIG. 1, a microphone 8 for gathering sound and an earphone jack 9 to which an earphone (not shown) is connected, are provided on the surface Z. Surface Y1 provides a release switch 10 and continuous recording mode switch 13. Release switch 10 is used when an object is recorded while the continuous recording mode switch 13 is used when the apparatus is switched to the continuous recording mode when recording an object. The release switch 10 and the continuous recording mode switch 13 are located beneath the viewfinder 2, the lens 3 and the light emitting unit 4.

As shown in FIG. 3, surface Y2 provides a power switch 11 and a recording switch 12 which is operated when recording sound. As with the release switch 10 and the continuous recording mode switch 13 described above, the recording switch 12 and the power switch 11 are also arranged beneath the viewfinder 2, the lens 3 and the light emitting unit 4. Moreover, the recording switch 12 and the release switch 10 are formed substantially at the same height, therefore, the user does not feel any difference when the camera is held in either the right or left hand.

Alternatively, the location of the recording and release switches 12 and 10, respectively, may be relocated such that the user does not accidentally press one switch while pressing the other switch, when the user offsets the moment created by the pressing of the desired switch by holding the other side surface.

The continuous recording mode switch 13 is used when the user desires to record one frame or several frames of an object by pressing the release switch 10. For example, if the indicator of the continuous recording mode switch 13 is pointed to the position printed "S", or S mode, and the release switch 10 is pressed, the camera only records one frame of information.

Moreover, if the indicator of the continuous recording mode switch 13 is pointed to the position printed "L", namely, the low speed continuous recording mode is enabled, and the release switch 10 is pressed, the camera records eight frames per second.

Furthermore, if the indicator of the continuous recording mode switch 13 is pointed to the position printed "H", then the high speed continuous recording mode is enabled, and when the release switch 10 is pressed, the camera records 30 frames per second.

Now, the internal structure of the electronic camera 1 will be described. FIG. 4 is a perspective rear view illustrating the internal construction of the electronic camera 1 shown in FIGS. 1, 2 and 3. The CCD 20 is provided behind the lens 3. The optical image of the object imaged through the lens 3 is photoelectrically converted to electric (image) signals.

The display device 26 in the viewfinder 2 is arranged inside the vision screen of the viewfinder 2 and displays the setting conditions and other functions while the user views an object through the viewfinder 2.

Four cylindrical batteries, such as, for example, AA dry cell batteries 21, are placed side-by-side beneath the LCD 6 so the electric power stored in the batteries 21 is supplied to each part of the camera 1. Moreover, a capacitor 22 is provided below the LCD 6 and next to the batteries 21 to accumulate an electric charge. The accumulated electric charge is used to allow the light emitting unit 4 to emit light.

Control circuits are formed on the circuit board 23 to control each part of the electronic camera 1. Moreover, a removable memory card 24 is provided between the circuit board 23, the LCD 6 and the batteries 21 so the various information that is input in the electronic camera 1 is recorded in the preassigned area of the memory card 24. The memory card 24 is removable, but memory in which various information can be recorded may be provided on the circuit board 23. Also, the various information recorded on the memory or memory card 24 may be output to an external personal computer and the like through an interface 48.

The LCD switch 25, which is located adjacent to the power source switch 11, only turns on when its plunger is pressed. As shown in Figure SA, the LCD switch 25 and the power source switch 11 are turned on by the arm member 14A of the LCD cover 14 when the LCD cover 14 is manipulated downward.

Figure 5A:
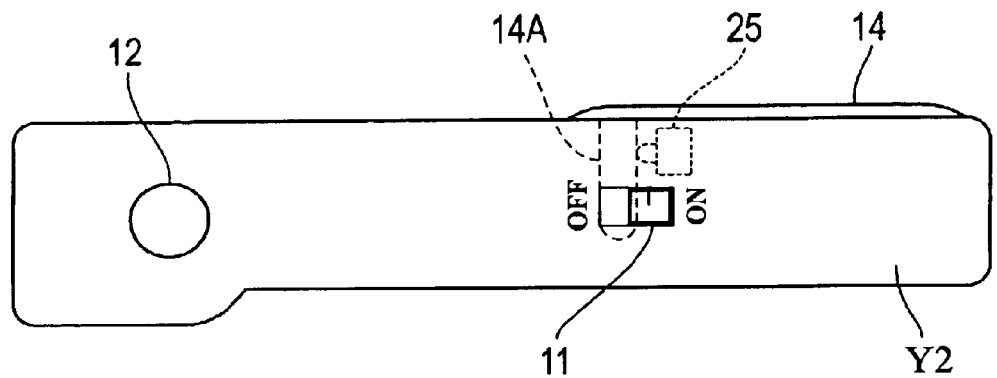
FIGS. 5A–5C are perspective plan views of the electronic camera of FIG. 1 illustrating the operation of the LCD switch and cover.
Figure 5B:
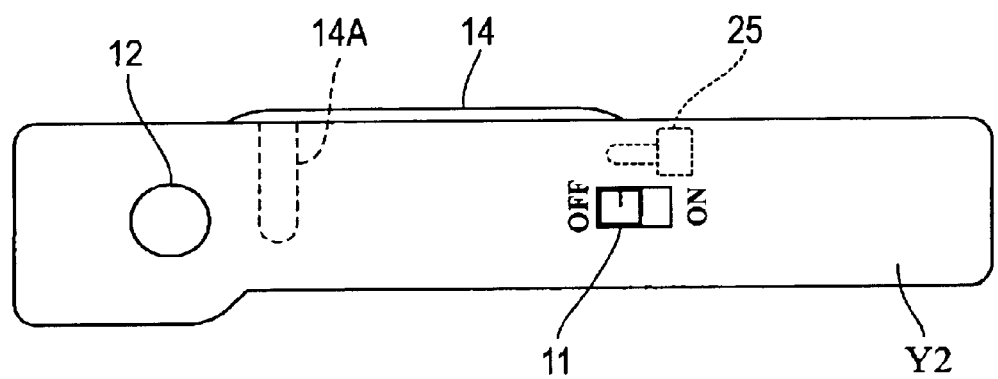
Figure 5C:
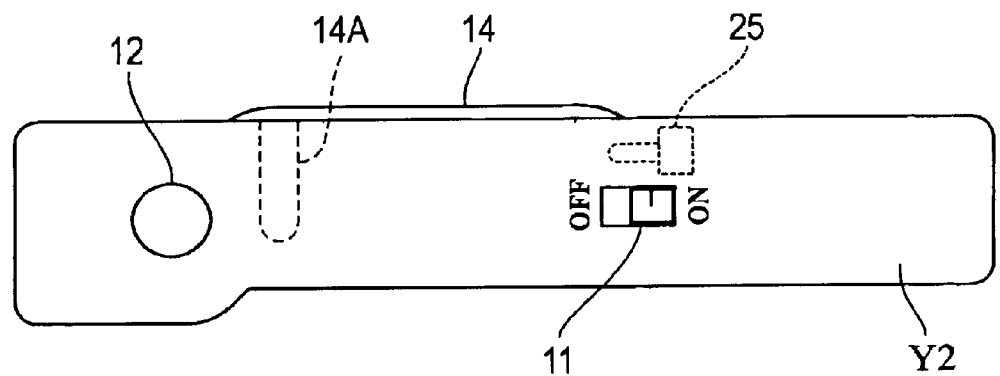

Therefore, if the LCD cover 14 is manipulated upward, the power source switch 11 may be operated by the user independent of the LCD switch 25. For example, if the LCD cover 14 is closed and the electronic camera 1 is not being used, the power source switch 11 and the LCD switch 25 are in the off-mode, as shown in FIG. 5B. In this mode, if the user switches the power source switch 11 to the on-mode, as shown in FIG. 5C, the power source switch 11 is in the on-mode, but the LCD switch 25 continues to be in the off-mode. Alternatively, when the power source switch 11 and the LCD switch 25 are both in the off-mode as shown in FIG. 5B, and if the LCD cover 14 is opened, the power source switch 11 and the LCD switch 25 will both be in the on-mode, as shown in FIG. 5A. Then when the LCD cover 14 is closed, only the LCD switch 25 is in the off-mode, as shown in FIG. 5C.

The internal electric structure of the electronic camera 1 of the present embodiment is described hereafter with reference to the block diagram of FIG. 6.

The CCD 20, which includes a plurality of pixels, photoelectrically converts the optical image imaged on each pixel into image signals, or electric signals. The digital signal processor (DSP) 33, in addition to supplying the CCD horizontal driving pulse to the CCD 20, supplies the CCD vertical driving pulse by controlling the CCD driving circuit (driver) 34.

The image processing unit (image processor) 31, which is controlled by the CPU 39, samples the image signals that are photoelectrically converted by the CCD 20 with predetermined timing, and amplifies the sampled signals to a predetermined level. The analog/digital conversion circuit (A/D converter) 32 digitizes the image signals that are sampled by the image processing unit 31 and supplies the signals to the DSP 33.

The DSP 33 controls the buffer memory 36. Via the data bus, which is connected to the memory card 24, DSP 33 temporarily stores the image data supplied from the A/D conversion circuit 32 in the buffer memory 36, reads the image data stored in the buffer memory 36, and then records the image data onto the memory card 24.

Additionally, the DSP 33 also instructs the frame memory 35 to store image data supplied by the A/D conversion circuit 32, displays the image data on the LCD 6, reads the recording image data from the memory card 24, decompresses the recording data, stores the decompressed image data in the frame memory 35, and displays the decompressed image data on the LCD 6.

When starting the electronic camera 1, the DSP 33 repeatedly operates the CCD 20 by adjusting the exposure time, or exposure value, until the exposure level of the CCD 20 reaches an appropriate level. At this time, the DSP 33 may operate the photometry circuit 51 first, then compute initial value of the exposure time of the CCD 20 corresponding to a light receiving level, which is detected by the photometry device 16. By so doing, the adjustment of exposure time for the CCD 20 is shortened.

In addition, the DSP 33 executes timing management for data input/output while information is being recorded on the memory card 24 and stores the decompressed image data in the buffer memory 36. The buffer memory 36 accommodates the difference between the data input/output speed for the memory card 24 and the processing speed at the CPU 39 and the DSP 33.

The microphone 8 inputs sound information, receives sound, and supplies the sound information to the A/D and D/A conversion circuit (converter) 42. The A/D and D/A conversion circuit 42 first converts the analog signals to digital signals, then supplies the digital signals to the CPU 39, then converts the sound data supplied by the CPU 39 to analog signals, and outputs the converted sound signals to the speaker 5.

The photometry device 16 measures the light amount of the object and its surrounding area and outputs the results to the photometry circuit 51. The photometry circuit 51 executes a predetermined process on the analog signals which contain the measurement results supplied from the photometry device 16, converts the analog signals to digital signals, and outputs the digital signals to the CPU 39.

The color measuring (colorimetry) device 17 measures the color temperature of the object and its surrounding area and outputs the measurement results to the colorimetry circuit 52. The colorimetry circuit 52 executes a predetermined process on the analog signals which contain the color temperature measurement results supplied from the photometry device 17, converts the analog signals to digital signals, and outputs the digital signals to the CPU 39.

The timer 45 has an internal clock circuit and outputs the data corresponding to the current date and time to the CPU 39.

The stop driving circuit (driver) 53 sets the diameter of the aperture stop 54 to a predetermined value. The stop 54 is arranged between the lens 3 and the CCD 20 and changes the aperture for the light entering from the lens 3 to the CCD 20.

The CPU 39 stops the operation of the photometry circuit 51 and the colorimetry circuit 52 when the LCD cover 14 is open. When the LCD cover 4 is closed, the CPU 39 runs the operation of the photometry circuit 51, as well as the colorimetry circuit 52, and stops the operation of the CCD 20 until the release switch 10 is in the half-depressed mode. When the operation of the CCD 20 is stopped, the CPU 39 receives the light measurement results of the photometry device 16 and the color measurement results of the colorimetry device 17 by controlling the photometry circuit 51 and the colorimetry circuit 52.

Also, the CPU 39 computes a white balance adjustment value corresponding to the color measurement supplied by the colorimetry circuit 52 using a predetermined table, and supplies the white balance value to the image processing unit 31.

In other words, when the LCD cover 14 is closed, the LCD 6 is not used as an electronic viewfinder, hence the operation of the CCD 20 stops. Since the CCD 20 consumes a large amount of electric power, by stopping the operation of the CCD 20 as described above, the power of the batteries 21 is conserved. Additionally, when the LCD cover 14 is closed, the image processing unit 31 is controlled so it does not execute various processes until the release switch 10 is operated, or is in the half-depressed mode. The stop driving circuit 53 will not execute an operation, such as the changing of the diameter of the aperture stop 54, until the release switch 10 is operated.

Moreover, the CPU 39 orders the strobe 4 to emit light at the user's discretion, by controlling the strobe driving circuit (driver) 37. The CPU 39 also instructs the red-eye reduction LED 15 to emit light at the discretion of the user, prior to ordering the strobe 4 to emit light, by controlling the red eye reduction LED driving circuit (driver) 38.

When the LCD cover 14 is open, in other words, when the electronic viewfinder is being used, the CPU 39 causes the strobe 4 not to emit light. By so doing, the object may be recorded as displayed in the electronic viewfinder.

The CPU 39, according to the date data supplied by the timer 45, records information concerning the date of recording the image as header information. The header information of the image data is recorded in the recording image recording area of the memory card 24.

Moreover, the CPU 39 temporarily records the digitized and compressed sound data, after compressing the digitized sound information, to the buffer memory 36. The CPU 39, then records the digitized and compressed sound data in the predetermined area, or sound recording area, of the memory card 24. Moreover, the data concerning the recording date is simultaneously recorded in the sound recording area of the memory card 24 as header information of the sound data.

The CPU 39 executes the auto focus operation by controlling the lens driving circuit (driver) 30 which manipulates the lens 3. The CPU 39 changes the aperture diameter of the stop 54 arranged between the lens 3 and the CCD 20 by controlling the stop driving circuit 53. The CPU 39 also displays the setting conditions and other functions for the user on the display device 26 inside the viewfinder 2 by controlling the display circuit 40 inside the viewfinder 2.

The CPU 39 exchanges predetermined data with a predetermined external apparatus (not shown) through an interface (I/F) 48.

The CPU 39 receives signals from the control key area 7 and processes them appropriately.

When the predetermined position in the touch tablet 6A is pressed by the pen 41 when operated by the user, the CPU 39 reads the X-Y coordinate of the position pressed on the touch tablet 6A and accumulates the coordinate data in the buffer memory 36. Then, the CPU 39 records the memo information accumulated in the buffer memory 36 together with header information, which consists of the memo information input date, in the memo information recording area of the memory card 24.

Now, the various operations of the electronic camera 1 of the present embodiment will be explained.

First, the operation of the electronic viewfinder in the LCD 6 of the present apparatus will be described. When the user half-depresses the release switch 10, the DSP 33 determines, based on the value of the signal corresponding to the status of the LCD switch 25 supplied by the CPU 39, whether or not the LCD cover 14 is open. If the LCD cover 14 is determined to be closed, the operation of the electronic viewfinder is not executed. When the cover 14 is closed, the DSP 33 stops the process until the release switch 10 is operated.

If the LCD cover 14 is closed and the operation of the electronic viewfinder is not executed, the CPU 39 stops the operation of the CCD 20, the image processing unit 31 and the stop driving circuit 53. The CPU 39 then causes the photometry circuit 51 and the colorimetry circuit 52 to operate instead of stopping the CCD 20, and supplies the measurement results to the image processing unit 31. The image processing unit 31 uses the values of measurement results to control the white balance and the brightness value.

If the release switch 10 is operated, the CPU 39 operates the CCD 20 and the stop driving circuit 53.

Contrarily, if the LCD cover 14 is open, the CCD 20 executes the electronic shutter operation with predetermined exposure time for each predetermined time interval, executes the photoelectric conversion of the photo image of the object gathered by the lens 3, and outputs the resulting image signals to the image processing unit 31.

The image processing unit 31 controls the white balance and brightness value, executes a predetermined process on the image signals, and then outputs the image signals to the A/D conversion circuit 32. In this instance, if the CCD 20 is operating, the image processing unit 31 uses an adjusted value for controlling the white balance and the brightness value. The adjusted value is computed based on the output from the CCD 20 by the CPU 39.

Furthermore, the A/D conversion circuit 32 converts the image signal, or analog signal, into the image data, which is a digital signal, and outputs the image data to the DSP 33. The DSP 33 outputs the image data to the frame memory 35 and instructs the LCD 6 to display the image corresponding to the image data.

When the LCD cover 14 is open, the CCD 20 operates the electronic shutter with a predetermined time interval. The CCD 20 also executes the operation of the electronic viewfinder by converting the signal output from the CCD 20 into image data, outputting the image data to the frame memory 35 and continuously displaying the image of the object on the LCD 6.

Moreover, if the LCD cover 14 is closed as described above, the electronic viewfinder operation is not executed and the operation of the CCD 20, the image processing unit 31 and the stop driving circuit 53 are halted to conserve energy.

Next, the recording of an object using the present apparatus will be described.

Figure 11:
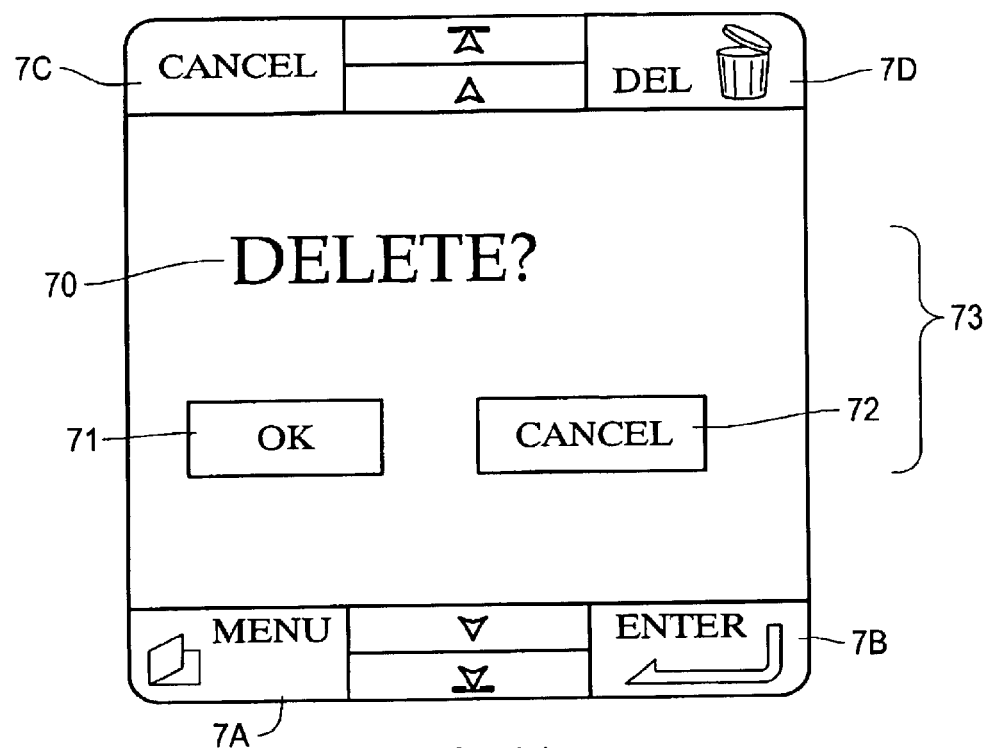
FIG. 11 illustrates the confirmation dialogue of the electronic camera of FIG. 1.

First, a case in which the continuous shooting mode switch 13, which is provided on the surface Y1, is switched to the S-mode, will be explained. As shown in FIG. 11, power is introduced to the electronic camera 1 by switching the power source switch 11 to the "ON" position. The recording process of the object begins when the release switch 10 on the surface Y1 is pressed after verifying the object with the viewfinder 2.

In this instance, if the LCD cover 14 is closed, the CPU 39 resumes the operation of the CCD 20, the image processing unit 31 and the stop driving circuit 53 when the release switch 10 is in half-depressed state. The CPU 39 begins the shooting process of the object when the release switch 10 becomes fully-depressed.

The image of the object being observed through the viewfinder 2 is gathered by the lens 3 and forms an image on the CCD 20, which has a plurality of pixels. The image that is imaged onto the CCD 20 is photoelectrically converted into an image signal by each pixel and sampled by the image processing unit 31. The image signal is then supplied to the A/D conversion circuit 32 where it is digitized and output to the DSP 33.

The DSP 33 first outputs the image temporarily to the buffer memory 36. The DSP 33 then reads the image data from the buffer memory 36, compresses the image data using the Joint Photographic Experts Group (JPEG) standard, and records the image data in the recording image recording area of the memory card 24. The JPEG is a combination of a discrete cosine transformation, quantization, and Huffman encoding. At this time, the recording date data is recorded as header information of the recording image data in the recording image recording area of the memory card 24.

If the continuous shooting mode switch 13 is switched to the S-mode, only one frame is recorded and further recording does not take place even if the release switch 10 is continued to be pressed. Additionally, if the release switch 10 is continued to be pressed, the image which has been recorded is displayed on the LCD 6 when the LCD cover 14 is open.

Next, a case in which the continuous shooting mode switch 13 is switched to the L-mode in which 8 frames per second are continuously recorded will be explained.

Power is introduced to the electronic camera 1 by switching the power source switch 11 to the "ON" position. The recording process of the object begins when the release switch 10 on the surface Y1 is pressed. If the LCD cover 14 is closed, the CPU 39 starts the operation of the CCD 20, the image processing unit 31 and the stop driving circuit 53 when the release switch 10 is in half-depressed state. The recording process of the object begins when the release switch 10 becomes fully-depressed.

The image of the object being observed through the viewfinder 2 is gathered by the lens 3 and an image is formed on the CCD 20. The image which is imaged on the CCD 20 is photoelectrically converted into the image signal by each pixel and sampled by the image processing unit 31 at a rate of 8 times per second. The image processing unit 31 thins out three-fourths of all the pixels of the image (electric) signals in the CCD 20. In other words, the image processing unit 31 divides the pixels in the CCD 20 into areas composed of 2×2 pixels (4 pixels), as illustrated in FIG. 7. The image processing unit 31 samples the image signal of one pixel from each area arranged on a predetermined location, thereby thinning out the remaining 3 pixels.

For example, during the first sampling, or first frame, the pixel a located in the upper left corner is sampled and the remaining pixels b, c and d are thinned out. During the second sampling, or second frame, the pixel b located in the upper right corner is sampled and the remaining pixels a, c and d are thinned out. Likewise, during the third and the fourth samplings, the pixels c and d, which are located at the lower left and the lower right corners respectively, are sampled and the remaining pixels are thinned out. In short, each pixel is sampled once during four samplings.

The image signals of one-fourth of all the pixels in the CCD 20 sampled by the image processing unit 31 are supplied to the A/D conversion circuit 32 where they are digitized and output to the DSP 33. The DSP 33, after outputting the image signals temporarily to the buffer memory 36, reads the image data from the buffer memory 36, compresses the image data using the JPEG method, and records the digitized and compressed recording image data in the recording image recording area of the memory card 24. The recording date data is then recorded as header information of the recording image data in the recording image recording area of the memory card 24.

When the continuous recording mode switch 13 is switched to the H-mode, 30 frames are recorded per second. Power is introduced to the electronic camera 1 by switching the power source switch 11 to the "ON" position. The recording process of the object begins when the release switch 10 on the surface Y1 is pressed. If the LCD cover 14 is closed, the CPU 39 starts the operation of the CCD 20, the image processing unit 31 and the stop driving circuit 53 when the release switch 10 is in the half-depressed state. When the release switch 10 become fully-depressed, the recording process begins.

The optical image of the object, which is observed through the viewfinder 2, is gathered by the lens 3 and imaged on the CCD 20. The optical image on the CCD 20 is photoelectrically converted to an image signal by each pixel and sampled 30 times per second by the image processing unit 31. Moreover, the image processing unit 31 thins out eight-ninths of the pixels in the image signals of all the pixels in the CCD 20. In other words, the image processing unit 31 divides the pixels in the CCD 20 into areas having 3×3 pixels (9 pixels), as shown in FIG. 8. The image processing unit 31 then samples, 30 times per second, the image signal of one pixel arranged on a predetermined location, thereby thinning out the remaining 8 pixels.

For example, during the first sampling, or first frame, the pixel a located in the upper left corner of each area is sampled and the remaining pixels b through i are thinned out. During the second sampling, or second frame, the pixel b located to the right of a is sampled and the pixels a and c through i are thinned out. Likewise, during the third and the fourth samplings, etc. the pixel c and then the pixel d, etc. are sampled respectively and the remaining pixels are thinned out. In short, each pixel is sampled once for every nine frames.

The image signals of one-ninth of all the pixels in the CCD 20 sampled by the image processing unit 31 are supplied to the A/D conversion circuit 32 where they are digitized and output to the DSP 33. The DSP 33, after outputting the image signals temporarily to the buffer memory 36, reads the image data from the buffer memory 36, compresses the image data using the JPEG method, and records the digitized and compressed recording image data in the recording image recording area of the memory card 24.

In this instance, light may be shined on the object, if necessary, by operating the strobe 4. However, when the LCD cover 14 is open, or when the LCD 6 is executing the electronic viewfinder operation, the CPU 39 controls the strobe 4 so as not to emit light.

Next, the operation in which two dimensional information, or pen input information, is input from the touch tablet 6A will be described.

When the touch tablet 6A is pressed by the tip of the pen 41, the X-Y coordinate of the contact point is supplied to the CPU 39. The X-Y coordinate is stored in the buffer memory 36. Moreover, the CPU 39 writes data on the address in the frame memory 35 which corresponds to each point of the X-Y coordinate, and a memo corresponding to the contact point of the pen 41 may be displayed in the X-Y coordinate on the LCD 6.

As previously described, the touch tablet 6A is made of transparent material. This enables the user to view the point of the location being pressed by the tip of the pen 41 displayed on the LCD 6, which gives an impression that the input is made by the pen directly onto the LCD 6. Moreover, when the pen 41 is moved on the touch tablet 6A, a line tracing the motion of the pen 41 is displayed on the LCD 6. If the pen 41 is moved intermittently on the touch tablet 6A, a dotted line tracing the motion of the pen 41 is displayed on the LCD 6. In this manner, the user is able to input memo information of desired letters, drawings and the like through the touch tablet 6A and view the same on the LCD 6.

Additionally, if the memo information is input by the pen 41 when the recording image is already displayed on the LCD 6, the memo information is synthesized (combined) with the recording image information by the frame memory 35 and both are displayed together on the LCD 6.

Optionally, by operating a predetermined pallet, the user is able to select the color of the memo displayed on the LCD 6.

If the execution key 7B of the control key area 7 is pressed after the memo information has been input through the touch tablet 6A by the pen 41, the memo information accumulated in the buffer memory 36 is supplied with header information of the input date to the memory card 24 and recorded in the memo information recording area of the memory card 24.

In this instance, the memo information recorded in the memory card 24 is compressed information. The memo information input through the touch tablet 6A contains information with a high spatial frequency component. Hence, if the aforementioned JPEG method is used for compressing the memo, the compression efficiency becomes poor and the information amount is not reduced thereby resulting in longer compression and decompression times. Also, compression by the JPEG method is lossey and is not suitable for compressing memo information having a small amount of information. This is true because the gathering and smearing due to missing information becomes noticeable when the information is decompressed and displayed on the LCD 6.

Hence, in the configuration of the present embodiment, memo information is compressed utilizing the run length method used in facsimile machines and the like. The run length method is a method in which the memo screen is scanned in the horizontal direction and the memo information is compressed by encoding each continuous length of information of each color, such as black, white, red and blue, as well as each continuous length of non-information where there has been no pen input. Using the run length method, memo information is compressed to reduce the amount of information and the ability to avoid losing information is possible, even when the compressed memo information is decompressed. Additionally, it is possible not to compress the memo information if the amount of the information is relatively small.

As mentioned above, if the memo information is input by the pen 41 when the recording image is already being displayed on the LCD 6, the pen input is synthesized with the recording image information by the frame memory 35 and both are displayed on the LCD 6. The recording image data is recorded in the recording image recording area and the memo information is recorded in the memo information recording area of the memory card 24. In this regard, two pieces of information are recorded separately, hence, the user is able to delete one of the two images from the synthesized image, enabling even further compression of each piece of information by another separate compression method.

Figure 9:
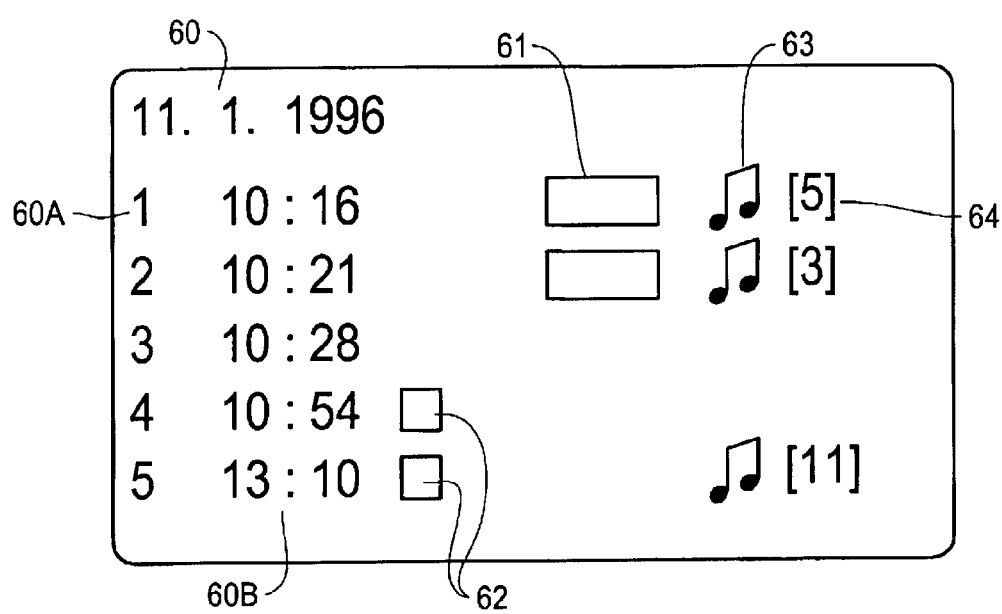
FIG. 9 illustrates symbols being displayed on the display screen of the electronic camera of FIG. 1.

As shown in FIG. 9, a table may be displayed in the LCD 6 when data is recorded in the sound recording area, the recording image recording area and the memo information recording area of the memory card 24.

In the display screen of the LCD 6, which is shown in FIG. 9, the date of recording information, or recording date 60, is displayed in the upper left section of the screen. The number 60A and the recording time 60B of the information recorded on the recording date 60 are displayed down the left-most side of the screen.

A thumbnail image 61 is displayed to the right of the recording time. The thumbnail image 61 is formed by thinning out (reducing) the bit map data of each image data of the recording image data recorded in the memory card 24. This display contains the recording image information. In other words, information which is recorded at "10:16" or "10:21", for example, contain the recording image information, but information recorded at other times does not contain image information (i.e., no thumbnail is displayed).

The memo icon 62 indicates that a predetermined memo is recorded as line drawing information.

Sound icons 63, which resemble musical notes, are displayed on the right of the thumbnail image 61 display area. To the right of the sound icons 63 are sound recording times 64, which are displayed in seconds. The sound recording times 64 will not be displayed if the sound information is not input for a particular entry.

The user selects and designates the information to be reproduced by pressing, with the tip of the pen 41, a desired sound icon 63. The selected information is reproduced by pressing, again with the tip of the pen 41, the execution key 7B as shown in FIG. 2.

For example, looking at FIG. 9, if the sound icon 63 for which "10:16" is shown is pressed by the pen 41, the CPU 39 reads the sound data corresponding to the selected recording date (and time) from the memory card 24, decompresses the sound data, and supplies the sound data to the A/D and D/A conversion circuit 42. The A/D and D/A conversion circuit 42 converts the data to analog signals, and reproduces the sound through the speaker 5.

In reproducing the recording image data recorded in the memory card 24, the user selects the information by pressing the desired thumbnail image 61 with the tip of the pen 41 and reproduces the selected information by pressing the execution key 7B.

In other words, the CPU 39 instructs the DSP 33 to read the recording image data corresponding to the selected recording image data from the memory card 24. The DSP 33 decompresses the recording image data read from the memory card 24. The recording image data is then accumulated as bit map data in the frame memory 35 and displayed on the LCD 6.

The image recorded in the S-mode is displayed on the LCD 6 as a still image. The still image is the image reproduced from the image signals of all the pixels in the CCD 20.

The image recorded in the L-mode is continuously displayed (as a moving picture) at 8 frames per second on the LCD 6. In this case, the number of pixels displayed in each frame is one-fourth of all of the pixels in the CCD 20.

Human vision is sensitive to the deterioration of resolution of a still image. Hence, the user may easily detect the thinning out of the pixels in the still image. However, when the recording speed is increased, as in the L-mode, where images are reproduced at 8 frames per second, although the number of pixels in each frame becomes one-fourth of the number of pixels of the CCD 20, because the human eyes observe images of 8 frames per second, the amount of information per unit time doubles compared to the still image.

In other words, assuming the number of pixels of a frame of the image recorded in the S-mode to be one, the number of pixels in one frame of the image recorded in the L-mode becomes one-fourth. When the still image recorded in the S-mode is displayed on the LCD 6, the amount of information viewed by the human eye per second is 1 (=(number of pixels 1)×(number of frames 1)). On the other hand, when the image is recorded in the L-mode and displayed on the LCD 6, the amount of information viewed by the human eye per second is 2 (=(number of pixels ¼)×(number of frames 8)), or twice as much information is viewed by the human eye than when in the S-mode. Hence, even when the number of pixels in one frame is reduced to one-fourth, the user does not notice much deterioration of the image quality during reproduction.

Moreover, in the configuration of the present embodiment, different sampling is executed for each frame and the sampled pixels are displayed on the LCD 6. Hence, an after image effect occurs for the human eye, so that the user is able to view the image recorded in the L-mode and displayed on the LCD 6 without much deterioration of the image quality. This is true even when three-fourths of the pixels are thinned out per one frame.

The image recorded in the H-mode is displayed on the LCD 6 for 30 frames per second. At this rate, the number of pixels displayed in each frame is one-ninth of the total number of pixels of the CCD 20. However, the user is able to view the image recorded in the H-mode and displayed on the LCD 6 without much deterioration of image quality for the same reasons as when in the L-mode.

When the object is recorded in the L-mode or the H-mode, because the image processing unit 31 thins out the pixels in the CCD 20 in such manner that the user does not notice deterioration of the image quality during reproduction, the load on the DSP 33 and the decompression process unit 34 is reduced, enabling low speed and low power operation of these units. Moreover, low cost and low energy consumption during operation of the apparatus is achieved.

As previously stated, recording memo information is also possible, in addition to recording the photo image of an object. This is possible because the input modes for inputting these types of information are provided. Also, these modes are selected according to the operation needed by the user, enabling a problem-free execution of information input.

Figure 10:
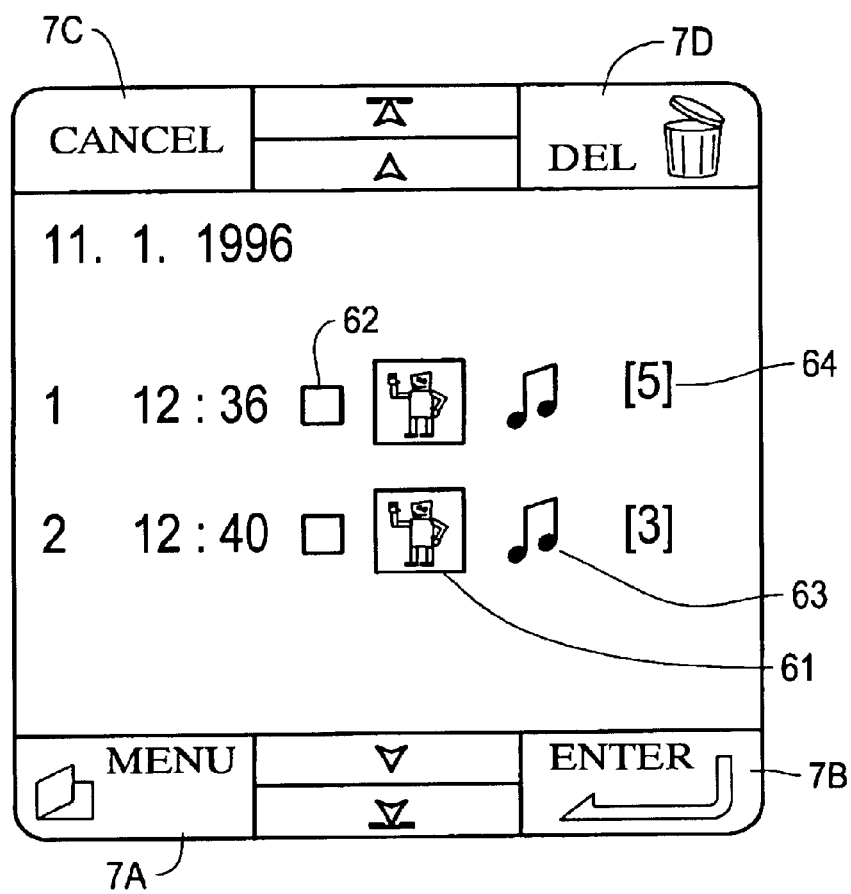
FIG. 10 illustrates symbols being displayed on the table screen of the electronic camera of FIG. 1.

FIG. 10 illustrates an example of a table that is to be displayed on the screen of the LCD 6 when image and sound are simultaneously recorded, followed by the recording of a memo. The recording date 60 of the information is displayed in the upper left corner of the screen, next to which thumbnail 61, memo 62 and sound 63 icons are displayed corresponding to the time 60B the information is recorded.

When deleting memo information, the memo icon 62 corresponding to the memo information to be deleted is selected using the pen 41. By doing this, information concerning the position of the memo icon 62 selected by the pen 41 is supplied to the CPU 39 by means of the touch tablet 6A. The CPU 39 recognizes, by the position information, that the memo icon 62 corresponding to the first information (entry no. 1) is selected. The CPU 39 then displays the memo icon 62, with emphasis, for example, in a positive-negative reversal (or highlighted) display, thereby indicating to the user that the selection of the memo icon 62 has been executed.

As illustrated in FIG. 11, when the delete key 7D is selected, the CPU 39 causes a confirmation "DELETE?" 70 message, and a confirmation dialogue 73, consisting of an "OK" 71 button and a "CANCEL" 72 button, to be displayed on the LCD 6. If the "OK" 71 button is selected, the CPU 39 deletes the memo information corresponding to the memo icon 62 shown in FIG. 10 from the memory card 24. The table is then re-displayed.

Figure 12:
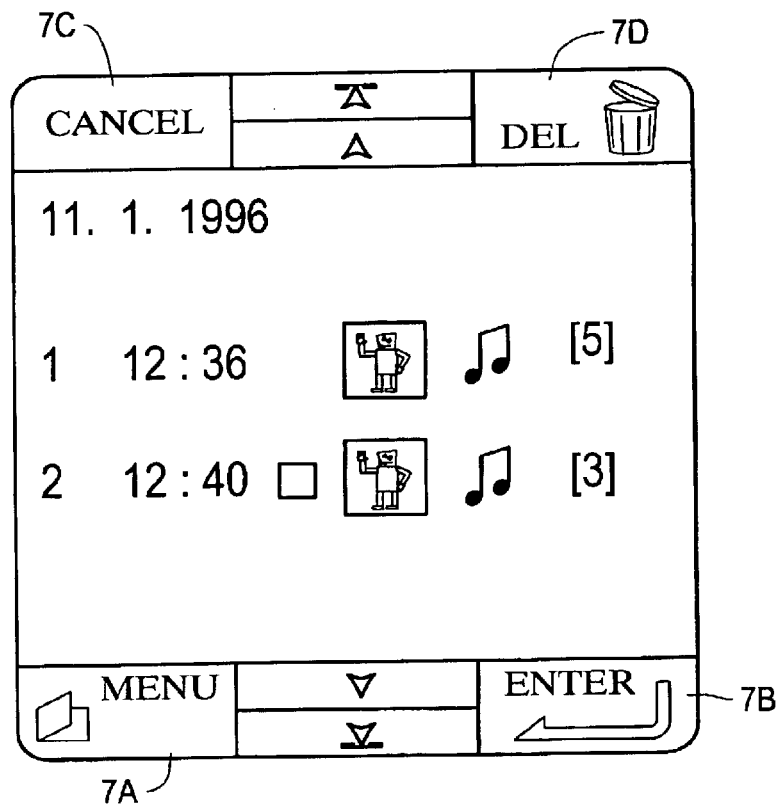
FIG. 12 illustrates a table screen after memo information from the first information has been deleted from the electronic camera of FIG. 1.

In the re-displayed table, the icon corresponding to the memo information in the deleted first information entry will not be displayed, as shown in FIG. 12. This tells the user that the selected memo information is deleted. Moreover, if the "CANCEL" 72 button is selected, no process is executed and the table shown in FIG. 10 is re-displayed.

Next, a case in which the sound information in the first information entry is deleted using the table displayed on the LCD 6 as shown in FIG. 10, will be explained.

If a sound icon 63, corresponding to sound information to be deleted, is selected using the pen 41, the selected sound icon 63 is displayed in a positive-negative reversal display (i.e., it is emphasized) by the control of the CPU 39. If the delete key 7D is selected, the confirmation dialogue shown in FIG. 11 is displayed on the LCD 6 screen. If the "OK" 71 button is selected, the sound information corresponding to the previously selected sound icon 63 is deleted from the memory card 24. The table is then re-displayed.

Figure 13:
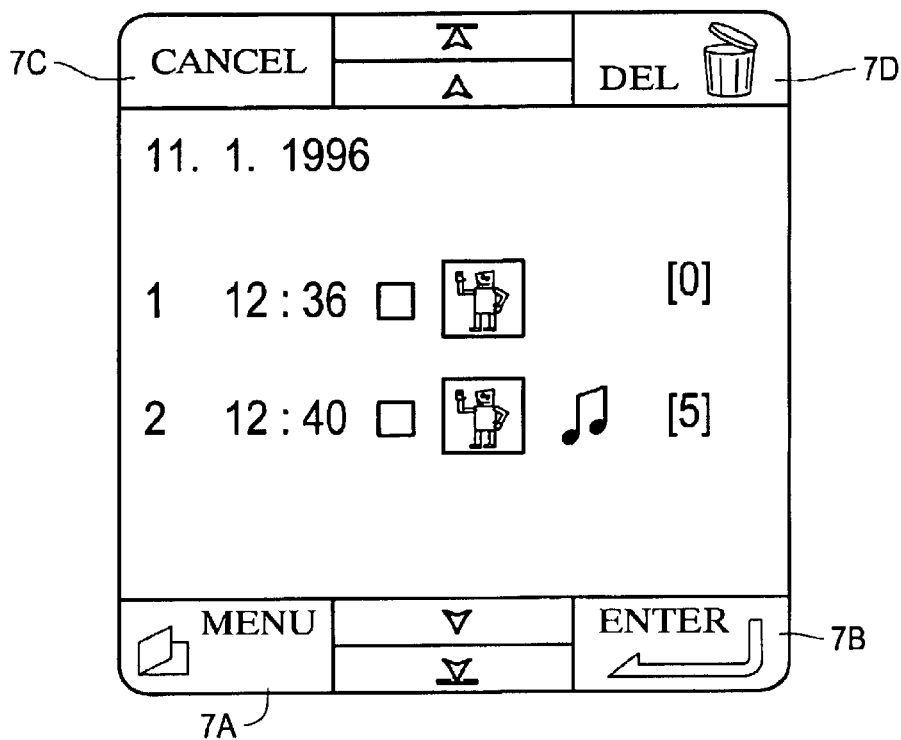
FIG. 13 illustrates a table screen after sound information from the first information has been deleted from the electronic camera of FIG. 1.

In the re-displayed table, the icon corresponding to the sound information in the first information entry is no longer displayed, as shown in FIG. 13, and "0" is displayed as the recording time. If the "CANCEL" 72 button is selected, no process is executed and the table shown in FIG. 10 is re-displayed.

Next, a case in which the image information in the first information entry is deleted using the table displayed on the LCD 6 as shown in FIG. 10, will be explained.

If a thumbnail image 61, corresponding to the image to be deleted is selected using the pen 41, the selection of the thumbnail image 61 is clearly indicated (i.e., emphasized) by displaying a rectangular box, for example, around the selected thumbnail image 61 by the control of the CPU 39.

Figure 14:
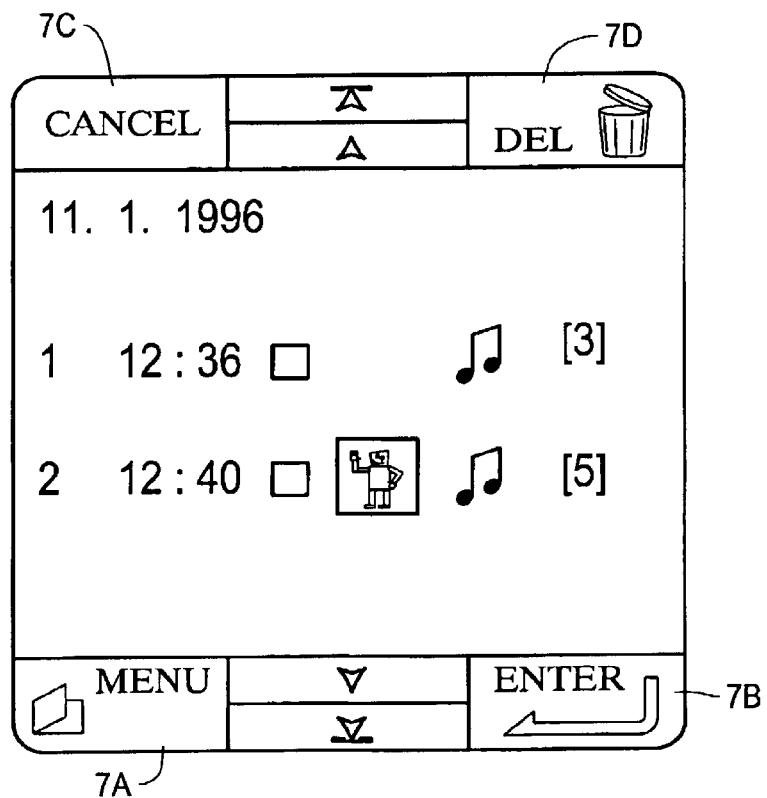
FIG. 14 illustrates a table screen after image information from the first information has been deleted from the electronic camera of FIG. 1.

If the delete key 7D is then selected, a confirmation dialogue 73, such as the one shown in FIG. 11, is displayed. If the "OK" 71 button is selected here, the image information corresponding to the thumbnail image 61 previously selected is deleted from the memory card 24, and the table, such as the one shown in FIG. 14, is displayed on the screen. The thumbnail image 61 in the first information entry is no longer displayed on this table. By this process, the user is able to know that the image corresponding to the selected thumbnail image 61 is deleted. Moreover, if the "CANCEL" 72 button is selected, no process is executed, but the table, as shown in FIG. 10, is re-displayed.

As described above, arbitrary information in various information entries stored in the memory card 24 may be deleted independent of other information.

In the above example, information to be deleted is selected individually, or one at a time, but it is also possible to delete a plurality of information simultaneously. In such a case, the memo icons 62, thumbnail images 61 and sound icons 63 corresponding to the plurality of information that is desired to be deleted are selected in the table. Then, the delete key 7D is selected and a confirmation dialogue 73, is displayed and the steps for deleting the selected information are carried out as explained above. Hence, a plurality of selected information may be deleted from the memory card 24.

In deleting a plurality of information, it is possible to select a plurality of information with the same or different date and time. For example, it is possible to select and delete a thumbnail image 61 and a sound icon 63 from the first information entry by selecting the delete key 7D. It is also possible to select and delete a thumbnail image 61 in the first information entry and a sound icon 63 in the second information entry by selecting the delete key 7D.

Next, an example in which the content of the information is confirmed before it is deleted by reproducing the information will be described.

In such a case, an execution key 7B is selected after selecting the memo icon 62, the thumbnail image 61 or the sound icon 63 corresponding to the information to be deleted. By doing this, the reproduction of the selected information begins. If the delete key 7D is selected after completing the reproduction, the confirmation dialogue 73 is displayed. If the "OK" 71 button is selected, the information that has just been reproduced is deleted from the memory card 24 and the LCD 6 screen displays the table again. On the other hand, if the "CANCEL" 72 button is selected, no process is executed and the LCD 6 screen displays the table again.

In this manner, in selecting and deleting the information, the selected information may be reproduced and the content confirmed so only the reproduced information is deleted. It is also possible to select a plurality of information, even in a situation such as the one described above, where the information is reproduced before it is deleted. For example, if the first thumbnail image 61 and the sound icon 63 are chosen and the execution key 7B is selected, reproduction of the information corresponding to the first thumbnail image 61 and sound icon 63 begins. If the delete key 7D is selected after the reproduction is completed, the confirmation dialogue 73 is displayed. If the "OK" 71 button is now selected, the information corresponding to the selected thumbnail image 61 and sound icon 63 are deleted from the memory card 24. Thus, as explained above, a plurality of information with the same date and time may be reproduced and deleted.

It is also possible to reproduce and delete a plurality of information having a different date and time. For example, if the first thumbnail image 61 and sound icon 63 and the second thumbnail image 61 and sound icon 63 are chosen, and the execution key 7B is selected, then reproduction of the information corresponding to the first thumbnail image 61 and sound icon 63 begins. When reproduction of this information is completed, reproduction of the information corresponding to the second thumbnail image 61 and sound icon 63 also occurs. If the delete key 7D is then selected after reproduction of the above information is completed, a confirmation dialogue 73, such as one shown in FIG. 11, is displayed. If the "OK" 71 button is then selected, the reproduced information corresponding to the first thumbnail image 61 and sound icon 63, as well as the reproduced information corresponding to the second thumbnail image 61 and sound icon 63 are deleted from the memory card 24.

A method for recording various information is mentioned in Japanese Laid-Open Patent Publication No. 8-81167, for which the present applicant applied. In fact, when various information is recorded in a recording mode, the date and time of the recording is recorded as header information. The various information can be image information, sound information and/or memo information. In addition, when a predetermined image is reproduced in the reproduction mode, the date and time header information is used to locate the sound and the memo input having a similar header information. The CPU 39 displays a table containing the various information in a time series based on the header information which includes the date and the time, and executes the selection of various information, as well as the reproduction and deletion of the information being selected.

Figure 15:
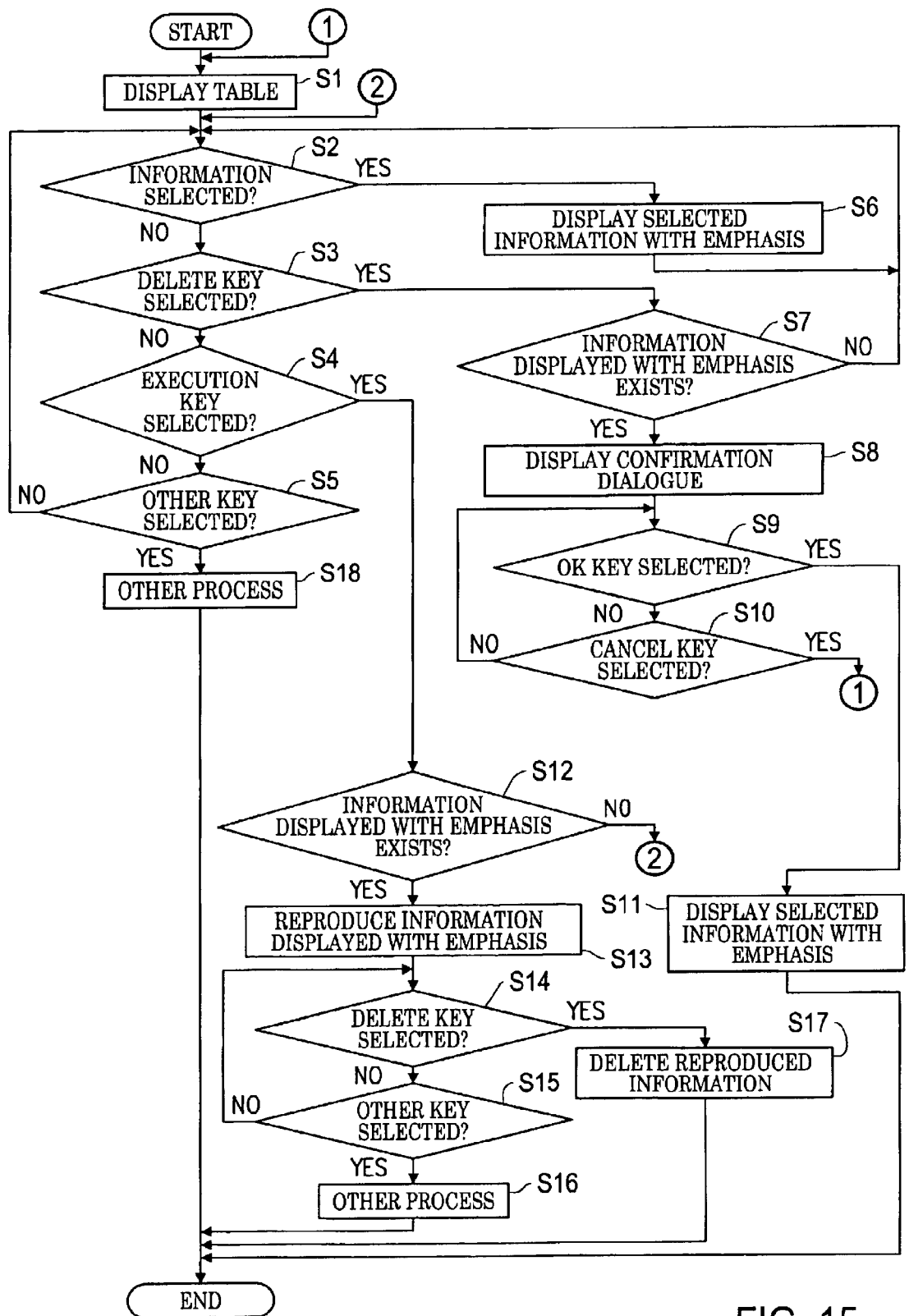
FIG. 15 is a block diagram illustrating the process of the CPU deleting stored information from the electronic camera of FIG. 1.

Next, the process of the CPU 39 in deleting stored information is described with reference to the flow chart in FIG. 15.

First, the CPU 39, in step S1, causes a table, such as the one shown in FIG. 10, to be displayed on the LCD 6. Next, the CPU 39 moves to step S2 and determines whether or not the information in the table is selected by the user. If the information in the table is determined to have been selected by the user, the CPU 36 moves to step S6 and displays the selected information with emphasis. For example, if the memo icon 62 is selected, the memo icon 62 is displayed in positive-negative reversal mode, or if the thumbnail image 61 is selected, a rectangular box is drawn around the thumbnail image 61. Also, if the sound icon 63 is selected, for example, the sound icon 63 is displayed in a positive-negative reversal mode. In this manner, the user learns that the selection of information has been executed. The CPU 39 then returns to step S2 and repeats the process in steps S2 and thereafter.

On the other hand, if the selection of information is determined not to have been executed in step S2, the CPU 39 moves to step S3 and determines whether or not the delete key 7D was selected. If the delete key 7D is determined to have been selected, the CPU 39 moves to step S7 and determines whether or not the information which is displayed with emphasis exists, if the information which is displayed with emphasis is determined not to exist, the CPU 39 returns to step S2 and repeats the process of steps S2 and thereafter. On the other hand, if the information which is displayed with emphasis is determined to exist, the CPU 39 moves to step S8.

In step S8, the CPU 39 displays a confirmation dialogue 73, such as the one shown in FIG. 11, and moves to step S9 where the CPU 39 determines whether or not the "OK" 71 or "CANCEL" 72 button was selected by the user. If the "OK" 71 button is determined to have been selected, the CPU 39 moves to step S11 where the information that is displayed with emphasis is deleted, and the process ends.

On the other hand, if the "OK" 71 button is determined not to have been selected, the CPU 39 moves to step S10 and determines whether or not the "CANCEL" 72 button was selected. If the "CANCEL" 72 button is determined not to have been selected, the CPU 39 returns to step S3 and repeats the process of step S9 and thereafter. Moreover, if the "CANCEL" 72 button is determined to have been selected, the CPU 39 moves to step S1 and repeats the process of steps S1 and thereafter.

In step S3, if the delete key 7D is determined not to have been selected, the CPU 39 moves to step S4. In step S4, the CPU 39 determines whether or not the execution key 7B was selected. If the execution key 7B is determined to have been selected, the CPU 39 determines whether or not the information displayed with emphasis exists. If the information displayed with emphasis is determined not to exist, the CPU 39 returns to step S2 and repeats the process of steps S2 and thereafter. On the other hand, if the information displayed with emphasis is determined to exist, the CPU 39 moves to step S13 and reproduces the information displayed with emphasis.

Next, in step S14, the CPU 39 determines whether or not the delete key 7D was selected. If the delete key 7D is determined to have been selected, the CPU 39 moves to step S17, deletes the information reproduced in step S13, and ends the process. On the other hand, if the delete key 7D is determined not to have been selected, the CPU 39 moves to step S15 and determines whether or not another key was selected. If another key is determined to have been selected, the CPU 39 moves to step S16, executes the process corresponding to the selected key and ends the process. If another key is determined not to have been selected in step S15, the CPU 39 returns to step S14 and repeats the process of steps S14 and thereafter.

Moreover, if the execution key 7B is determined not to have been selected in step S4, the CPU 39 moves to step S5 and determines whether or not another key was selected. If another key is determined not to have been selected, the CPU 39 returns to step S2 and repeats the process of steps S14 and thereafter. If another key was determined to have been selected, the CPU 39 moves to step S18 and executes the process corresponding to the selected key and ends the process.

In this manner, deletion of an arbitrary piece or plurality of information selected by the user out of multiple types of information stored in the memory card 24 is completed.

The screen layout in the LCD 6 in the configuration of the present embodiment described above is an example and does not limit the application of the present invention.

Although the JPEG and run length encoding compression techniques were described, other compression techniques (or no compression at all) can be used with the invention.

Although a touch tablet with input pen were described as structures through which selections and commands can be input, the invention is not limited to such structure. For example, the touch tablet can be actuable by the user's finger. Additionally, selections and commands can be input without using a touch tablet. For example, a cursor can be moved (e.g., via a mouse) and selections or commands can be made by clicking.

The invention is not limited to implementation by a programmed general purpose computer as shown in the preferred embodiment. For example, the invention can be implemented using one or more special purpose integrated circuit(s) (e.g., ASIC). It will be appreciated by those skilled in the art that the invention can also be implemented using one or more dedicated or programmable integrated or other electronic circuits or devices (e.g., hardwired electronic or logic circuits such as discrete element circuits, or programmable logic devices such as PLDs, PLAs, PALs or the like). In general, any device or assembly of devices on which a finite state machine capable of implementing the flowcharts shown in FIG. 15 can be used.

While the invention has been described in conjunction with specific embodiments thereof, it is evident that many alternatives, modifications and variations may be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An imaging device, comprising:

an input device which simultaneously or non-simultaneously obtains a plurality of different types of information;

a memory which stores a plurality of groups, each group formed by the plurality of different types of information in association with each other;

a display device that displays, in association with each other, each of two or more displays expressing different types of information, among the plurality of different types of information that are stored in the memory in association with each other, in a display state in which the displays can be individually selected, wherein the displays are displayed on the display device for each of the groups;

a designation device which individually selects the displays that express a plurality of pieces of information to be deleted, based on a user's operation, from among the individually selectable displays, showing two or more of the different types of information stored in association with each other, which are displayed on the display device, and individually designates the plurality of pieces of information corresponding to the respective selected displays as information to be deleted from among the plurality of groups;

a deletion instruction device which instructs that the plurality of pieces of information, which have been designated by the designation device, in a state in which the plurality of pieces of information have been individually designated by the designation device, be deleted;

a display control device which displays on the display device a confirmation dialogue which confirms whether deletion is to be performed, based on the instruction for deletion of the plurality of pieces of information by the deletion instruction device;

a selection device which selects whether the deleting operation is to be performed from the confirmation dialogue which is displayed on the display device;

a deletion device which deletes the plurality of pieces of information, which have been designated by the designation device, from the memory when allowance of performing the deleting operation is selected in the confirmation dialogue by the selecting device; and wherein the display control device further displays each display showing the plurality of pieces of information which have been individually selected by the designation device in a display state which can be differentiated from displays that have not been selected by the designation device.

2. An imaging device according to claim 1, further comprising:

a reproduction device that reads the plurality of pieces of information from the memory, which have been designated by the designation device, and reproduces the plurality of pieces of information, prior to the deleting operation of the plurality of pieces of information by the deletion device, based on the plurality of pieces of information being designated by the designation device.

3. An information processing apparatus, comprising:

an input device which simultaneously or non-simultaneously obtains a plurality of different types of information;

a memory which stores a plurality of groups each formed by the plurality of different types of information, the plurality of different types of information being in association with each other;

a display device which displays a list of groups, each group formed by the plurality of different types of information stored in association with each other in the memory, with displays of at least one type of information in each group being displayed in a display state in which the displays can be individually selected;

a designation device which individually selects two or more of the individually selectable displays of a same type of information, based on a user's operation, while two or more of the groups of the list are displayed on the display device, and designates two or more pieces of information corresponding to the selected displays as information to be deleted from among the plurality of groups;

a deletion instruction device which instructs the two or more pieces of information, which have been designated by the designation device, in a state in which the two or more pieces of information have been designated by the designation device, be deleted;

a deletion device which deletes the two or more pieces of information, which have been individually designated by the designation device, from the memory, based on the deletion instruction of the deletion instruction device; and a display control device which displays on the display device a confirmation dialogue to confirm whether the deleting operation is to be performed, prior to the deleting operation of the two or more pieces of information by the deletion device, based on the deletion instruction by the deletion instruction device, and deletes the displays for the two or more pieces of information selected by the designation device, from the list displayed by the display device when the deleting operation is allowed by the confirmation dialogue;

wherein the deletion device performs the deleting operation when allowance of performing the deleting operation is selected by the confirmation dialogue.

4. An information processing apparatus according to claim 3, further comprising:

a reproduction device which sequentially reproduces the two or more pieces of information stored in the memory, based on the two or more pieces of information being designated by the designation device.

5. An information processing apparatus according to claim 3, wherein:

the display control device further displays each of the displays on the list showing the two or more different pieces of information selected by the designation device, on the display device in a display state which can be distinguished from a display that has not been selected by the designation device.

6. An information processing apparatus, comprising:

an input device which simultaneously or non-simultaneously obtains a plurality of different types of information;

a memory which stores a plurality of groups each formed by the plurality of different types of information in association with each other;

a display device which displays a list of groups, each group formed by the plurality of different types of information stored in association with each other in the memory, with displays for two types of information in each group being displayed in a display state in which the displays can be individually selected;

a designation device which individually selects the individually selectable displays for the two types of information, based on a user's operation, while two or more of the groups on the list are displayed on the display device, and designates two or more pieces of information corresponding to the selected displays as information to be deleted from among the plurality of groups;

a deletion instruction device which instructs that the two or more pieces of information, which have been individually designated by the designation device, in a state in which the two or more pieces of information are designated by the designation device, be deleted;

a deletion device which deletes the two or more pieces of information, which have been individually designated by the designation device, from the memory, based on the deletion instruction of the deletion instruction device; and a display control device which deletes the displays of the two or more pieces of information, which have been selected by the designation device, from the list displayed by the display device, based on the deletion instruction of the deletion instruction device.

7. An information processing apparatus according to claim 6, wherein the display control device further displays on the display device a confirmation dialogue to confirm whether the deleting operation is to be performed, prior to the deleting operation of the two or more pieces of information by the deletion device, based on the deletion instruction by the deletion instruction device, and further deletes the displays for the two or more pieces of information selected by the designation device, from the list displayed by the display device when allowance of performing the deleting operation is selected by the confirmation dialogue; and the deletion device performs the deleting operation when allowance of the deleting operation is selected by the confirmation dialogue.

8. An information processing apparatus according to claim 6, wherein the display control device further displays each of the displays on the list showing the two or more different pieces of information selected by the designation device, on the display device in a display state which can be distinguished from a display that has not been selected by the designation device.

9. A camera, comprising:

an image information input device which images an object via a shooting lens and inputs image information;

a microphone which obtains sound information;

a memory which stores a plurality of groups, each group formed by the image information and the sound information in association with each other;

a display device which displays a list of the image information and the sound information in association with each other in each of the plurality of groups, with a display of at least one of the image information and the sound information in each group being displayed in an individually selectable display state;

a designation device which selects the one individually selectable display that expresses the information to be deleted from among the plurality of groups associated with the list displayed on the display device, based on a user's operation, and individually designates the information corresponding to the selected display as information to be deleted from among the plurality of groups;

a display control device that displays the display showing the information selected by the designation device on the display device, in a manner in which it can be differentiated from a display that has not been selected by the designation device;

a deletion instruction device which instructs that the information which has been designated by the designation device be deleted; and a deletion device which performs a deleting operation which deletes from the memory the information designated by the designation device; wherein the display control device further displays on the display a confirmation dialogue to confirm whether the deleting operation is to be performed, prior to the deleting operation of the information by the deletion device, after the deletion is instructed by the deletion instruction device;

the deletion device performs the deleting operation when allowance of the deleting operation is selected by the confirmation dialogue; and the display device deletes the display corresponding to the information designated by the designation device from the display screen when allowance of the deleting operation is selected by the confirmation dialogue.

10. A camera, comprising:

an image information input device which images an object via a shooting lens and obtains image information;

an other information input device which obtains two or more types of different information other than the image information;

a memory which stores a plurality of groups, each group formed by a plurality of different types of information associated with each other, including the image information input from the image information input device and the two or more of different types of information input from the other information input device;

a display device which displays, in association with each other and in a state in which two or more displays showing different types of information can be individually selected, the two or more displays showing the different types of information from among the plurality of different types of information stored in association with each other in the memory, wherein the displays are displayed on the display device for each of the groups;

a designation device which individually selects a plurality of displays showing the respective information to be deleted, based on a user's operation, from among the individually selectable displays showing two or more different types of information associated with each other, and which are displayed on the display device, the designation device further designates a plurality of pieces of information corresponding to the respective selected displays as information to be deleted from among the plurality of groups;

a deletion instruction device which instructs that the plurality of pieces of information, which have been designated by the designation device, in a state in which the plurality of pieces of information have been designated by the designation device, be deleted;

a deletion device which deletes from the memory the plurality of pieces of information which have been individually designated by the designation device based on the instruction of the deletion instruction device;

a reproduction device that reads the plurality of pieces of information, which have been designated by the designation device, from the memory and reproduces the plurality of pieces of information, prior to the operation of deleting the plurality of pieces of information by the deletion device, based on the designating operation of the plurality of types of information by the designation device;

a display control device that displays on the display device a confirmation dialogue to confirm whether the deleting operation is to be performed, prior to the deleting operation of the plurality of pieces of information by the deletion device, after the reproducing operation of the plurality of pieces of information by the reproduction device has begun and after the plurality of pieces of information have been instructed to be deleted by the deletion instruction device; and a selection device that selects whether the deleting operation is to performed from the confirmation dialogue displayed on the display device, wherein the deletion device performs a deleting operation in which the plurality of pieces of information designated by the designation device is deleted from the memory when allowance of the deleting operation is selected by the confirmation dialogue.

11. A camera, comprising:

an image information input device which images an object via a shooting lens and obtains image information;

a microphone which obtains sound information;

a memory which stores a plurality of groups, each group having the image information and the sound information associated with each other;

a display device which displays a list of the image information and the sound information in association with each other in each of the plurality of groups, with a display of at least one of the image information and the sound information in each group being displayed in an individually selectable state;

a designation device that individually selects the individually selectable displays of two or more pieces of the information from among two or more of the groups in association with the list displayed on the display device, based on a user's operation, and designates the two or more pieces of information as information to be deleted from among the plurality of groups;

a deletion instruction device which instructs the two or more pieces of information to be deleted which have been individually designated by the designation device, in a state in which the two or more pieces of information have been designated by the designation device;

a deletion device which deletes the two or more pieces of information, which have been individually designated by the designation device, from the memory, based on the deletion instruction of the deletion instruction device; and a display control device which displays, on the display device, the listed displays that show the two or more pieces of information selected by the designation device, in a display state which can be differentiated from a display which has not been selected by the designation device, and displays on the display device a confirmation dialogue to confirm whether the deleting operation is to be performed, prior to the deleting operation of the two or more pieces of information by the deletion device, based on the deletion instruction by the deletion instruction device;

wherein the deletion device performs the deleting operation when allowance of the deleting operation is selected by the confirmation dialogue; and the display control device deletes the displays for the two or more pieces of information selected by the designation device, from the list which is displayed by the display device when allowance of performing the deleting operation is selected by the confirmation dialogue.

12. A method for processing information that includes imaging information, comprising:

obtaining, simultaneously or non-simultaneously, a plurality of different types of information with an input device;

storing a plurality of groups, each group formed by the plurality of different types of information associated with each other in a memory;

displaying, with a display device, in association with each other, each of two or more displays expressing different types of information, among the plurality of different types of information that are stored in the memory in association with each other, in a display state in which the displays can be individually selected, wherein the displays are displayed on the display device for each of the groups;

individually selecting, with a designation device, the displays that express a plurality of pieces of information to be deleted, based on a user's operation, from among the individually selectable displays, showing two or more of the different types of information stored in association with each other, which are displayed on the display device, and individually designating the plurality of pieces of information corresponding to the respective selected displays as information to be deleted from among the plurality of groups;

instructing, with a deletion instruction device, that the plurality of pieces of information, which have been designated by the designation device, in a state in which the plurality of pieces of information have been individually designated by the designation device, be deleted;

displaying on the display device, a confirmation dialogue which confirms whether deletion is to be performed, based on the instruction for deletion of the plurality of pieces of information by the deletion instruction device, with a display control device;

selecting, with a selection device, whether the deleting operation is to be performed from the confirmation dialogue which is displayed on the display device;

deleting, with a deletion device, the plurality of pieces of information which have been designated by the designation device from the memory when allowance of performing the deleting operation is selected in the confirmation dialogue by the selecting device; and further displaying, with the display control device, each display showing the plurality of pieces of information which have been individually selected by the designation device in a display state which can be differentiated from displays that have not been selected by the designation device.

13. The method according to claim 12, further comprising:

reading, with a reproduction device, the plurality of pieces of information from the memory, which have been designated by the designation device, and reproducing the plurality of pieces of information, prior to the deleting operation of the plurality of pieces of information by the deletion device, based on the plurality of pieces of information being designated by the designation device.

14. A method for processing information, comprising:

obtaining, simultaneously or non-simultaneously, a plurality of different types of information with an input device;

storing a plurality of groups, each formed by the plurality of different types of information in a memory, the plurality of different types of information being in association with each other;

displaying, with a display device, a list of groups, each group formed by the plurality of different types of information stored in association with each other in the memory, with displays of at least one type of information in each group being displayed in a display state in which the displays can be individually selected;

individually selecting, with a designation device, two or more of the individually selectable displays of a same type of the information, based on a user's operation, while displaying on the display device two or more of the groups of the list, and designating two or more pieces of information corresponding to the selected displays as information to be deleted from among the plurality of groups;

instructing, with a deletion instruction device, the two or more pieces of information, which have been designated by the designation device, in a state in which the two or more pieces of information have been designated by the designation device, be deleted;

deleting, with a deletion device, the two or more pieces of information, which have been individually designated by the designation device, from the memory, based on the deletion instruction of the deletion instruction device;

displaying, with a display control device, on the display device a confirmation dialogue to confirm whether the deleting operation is to be performed, prior to the deleting operation of the two or more pieces of information by the deletion device, based on the deletion instruction by the deletion instruction device, and deleting the displays for the two or more pieces of information selected by the designation device from the list displayed by the display device when the deleting operation is allowed by the confirmation dialogue; and performing, with the deletion device, the deleting operation when allowance of performing the deleting operation is selected by the confirmation dialogue.

15. The method according to claim 14, further comprising:

sequentially reproducing, with a reproduction device, the two or more pieces of information stored in the memory, based on the two or more pieces of information being designated by the designation device.

16. The method according to claim 14, further comprising:

further displaying, with the display control device, each of the displays on the list showing the two or more different pieces of information selected by the designation device on the display device in a display state which can be distinguished from a display that has not been selected by the designation device.

17. A method for processing information, comprising:

obtaining, simultaneously or non-simultaneously, a plurality of different types of information with an input device;

storing a plurality of groups each formed by the plurality of different types of information in association with each other in a memory;

displaying, with a display device, a list of groups, each group formed by the plurality of different types of information stored in association with each other in the memory, with displays for two types of information in each group being displayed in a display state in which the displays can be individually selected;

individually selecting, with a designation device, the individually selectable displays for the two types of information, based on a user's operation, while displaying on the display device two or more of the groups on the list, and designating two or more pieces of information corresponding to the selected displays as information to be deleted from among the plurality of groups;

instructing, with a deletion instruction device, that the two or more pieces of information, which have been individually designated by the designation device, in a state in which the two or more pieces of information are designated by the designation device, be deleted;

deleting, with a deletion device, the two or more pieces of information, which have been individually designated by the designation device, from the memory, based on the deletion instruction of the deletion instruction device; and deleting, with a display control device, the displays of the two or more pieces of information, which have been selected by the designation device, from the list displayed by the display device, based on the deletion instruction of the deletion instruction device.

18. The method according to claim 17, further comprising:

further displaying, with the display control device on the display device, a confirmation dialogue to confirm whether the deleting operation is to be performed, prior to the deleting operation of the two or more pieces of information by the deletion device, based on the deletion instruction by the deletion instruction device, and further deleting the displays for the two or more pieces of information selected by the designation device from the list displayed by the display device when allowance of performing the deleting operation is selected by the confirmation dialogue; and performing, with the deletion device, the deleting operation when allowance of the deleting operation is selected by the confirmation dialogue.

19. The method according to claim 17, further comprising:

further displaying, with the display control device, each of the displays on the list showing the two or more different pieces of information selected by the designation device on the display device, in a display state which can be distinguished from a display that has not been selected by the designation device.

* * * * *